Aug. 9, 1960     C. E. BARKALOW     2,948,156

LINEAR INTEGRATING TORQUING MECHANISM

Filed Nov. 1, 1957

INVENTOR.
CLARE E. BARKALOW

BY *Clyde H. Waynes*

ATTORNEY

2,948,156
LINEAR INTEGRATING TORQUING MECHANISM

Clare E. Barkalow, Comstock Park, Mich., assignor to Lear, Incorporated

Filed Nov. 1, 1957, Ser. No. 693,960

5 Claims. (Cl. 74—5.6)

The present invention relates to a linear integrating torquing mechanism wherein torque is transmitted through fluid between angularly movable members in close proximity to each other.

The invention is particularly adaptable for use in connection with rate integrator types of gyroscopes, forced balanced accelerometers, rate gyroscopes, integrating accelerometers and other similar devices requiring or utilizing a reaction torque accurately linear with angular velocity.

One of the objects of the present invention is to use a fluid having Newtonian characteristics between angularly movable or rotative members to linearly transmit torque from one member to the other member.

Another object of the present invention is to provide a mechanism having a viscous torquer.

Another object of the invention is to provide a mechanism in which a wheel is rotatably carried by a member mounted in close proximity to another member in a housing in such manner that both members are angularly movable about parallel axes perpendicular to the wheel spin axis and a fluid cooperates with the members to transmit torquing action from one member to the other member.

A further object of the present invention is to provide a mechanism with a viscous torquer which is simple in construction, economical to manufacture and reliable in operation.

Figure 1:
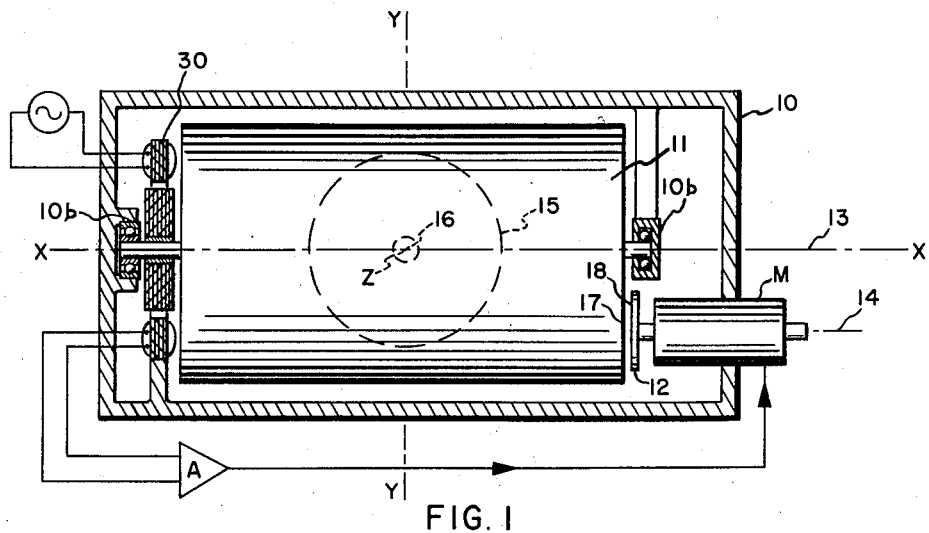
Figure 2:
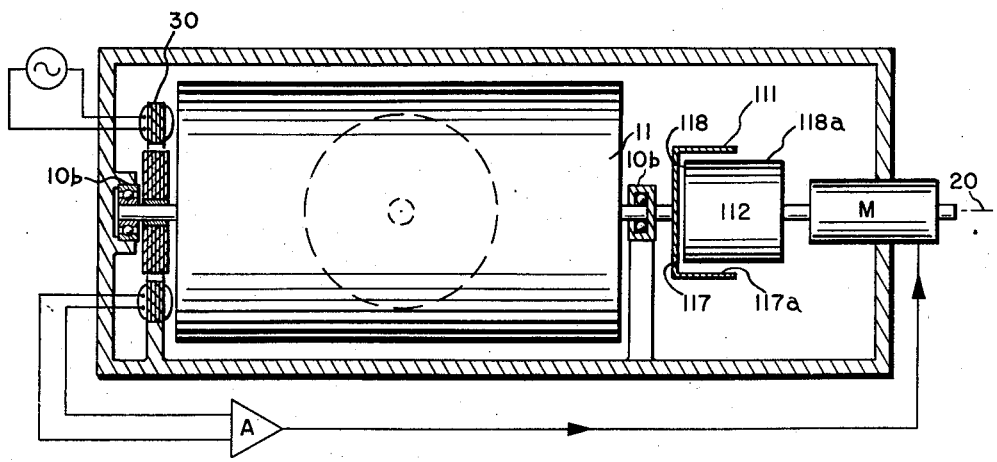

Other objects and a fuller understanding of the invention will become apparent from the following description of a preferred embodiment of the invention when taken in conjunction with the attached drawing in which:

Figure 1 is a view in cross-section of a preferred embodiment of the invention; and Figure 2 is a view in cross-section of an alternate embodiment of the invention.

The present invention may take the form of a housing inclosing angularly movable members mounted in close proximity to each other and for angular movement about parallel axes. The housing is filled with a fluid which cooperates with the members to transmit torquing action from one member to the other. To obtain linear torquing action between the members, the fluid has Newtonian characteristics. Further, the members have opposed smooth surfaces engaged by the fluid which transmits torquing action therebetween.

When a motor is drivingly connected to one of the members, the motor provides torquing forces which are transmitted between the members for torquing purposes, or the motor may be used to measure torquing action derived in one member and transmitted thereby through the fluid and between the members. Such a motor may be controlled by a pickoff measuring movement of one member relative to the other member, thus making the motor responsive to relative movement of the members.

For purposes of explanation, and not of limitation, the present invention will be described and illustrated in the form of a gyroscopic device. A gyroscope wheel may be rotatably carried by one of the members with its spin axis perpendicular to said parallel axes. Further, and in accordance with the invention, the member supporting the gyroscope wheel constitutes a hollow case inclosing the gyroscope wheel.

Referring to Figure 1 of the drawing, there is illustrated a gyroscopic device comprising a housing 10 and first and second angularly movable members 11 and 12 mounted in close proximity to each other in the housing for angular movement about parallel axes 13 and 14. The housing 10 contains a fluid (not shown in the drawing) which cooperates with the members 11 and 12 to transmit torquing action from member 11 to member 12, or vice-versa. A gyroscope wheel 15 is rotatably carried by member 11 with its spin axis 16 perpendicular to the parallel axes 13 and 14.

As is further illustrated, member 11 constitutes a hollow case bearingly supported by bearing 10b in housing 10 and inclosing the gyroscope wheel 15 with the spin axis 16 (Z axis) perpendicular to the bearing axis 13. Case 11 has a smooth surface 17 on the end thereof which is flat and perpendicular to axis 16 and member 12 has a smooth surface 18 complementary therewith and spaced therefrom. Further, member 12 is rotatably supported by and drivingly connected to a motor M which imparts rotation to member 12 to torque case 11 by means of the viscous fluid in the housing 10 and between surfaces 17 and 18.

Although the motor may be operated as hereinbefore described, the motor may also be responsive to relative movement between the members 10 and 11 to urge the members to maintain a desired position, for example, a null position. In such cases a closed loop is obtained by providing a pickoff 30 on the pivot axis 13 or x—x to provide an electrical signal when case 11 moves or tends to move about axis x—x and relative to housing 10, and feeding this signal to an amplifier A which energized motor M. The pickoff may be of any suitable type, such as the synchro illustrated in the drawing. In this closed loop, displacement of case 11 relative to housing 10 causes an electrical signal which controls motor M in such manner that the motor tends to drive the case to its original position relative to the housing.

Figure 2 illustrates an alternate embodiment wherein the parallel axes of rotation are superimposed on one another to form a single axis 20. In this case there is a cup-shaped member 111 secured to the gyroscope case 11 and providing both flat and cylindrical surfaces 117 and 117a for cooperating with the respective flat and cylindrical surfaces 118 and 118a of member 112. The structure in Figure 2 operates similar to that of Figure 1.

The operation of the linear integrating torquing mechanism may be set forth in formulas wherein:

$\omega_m$ is the angular velocity of the motor shaft about axis 14;

$L_x$ is the torque transmitted about axis x—x through viscous fluid between surfaces 17 and 18;

K is the constant of proportionality between $\omega_m$ and $L_x$;

$t$ is time;

$\theta_m$ is the angular displacement of the motor shaft about axis 14;

$L_x'$ is the applied torque about axis x—x associated with the transducer input (e.g., acceleration, rate of turn, etc.);

$A_z$ is the applied acceleration along axis z—z;

$K_1$ is the constant of proportionality between $L_x'$ and $A_z$;

$V_z$ is the linear velocity along axis z—z;

$\omega_y$ is the input angular rate of rotation of case 10 about axis y—y;

$K_2$ is the constant of proportionality between $L_x'$ and $\omega_y$; and $\theta_y$ is the angular displacement of case 10 about axis y—y.

In both forms shown, the torque produced about axis $x$—$x$ on the rotating member will be, for damping fluids with Newtonian characteristics, strictly linear with the rotating disc (or drum) angular velocity $\omega_m$, then $$L_x = K\omega_m$$

or $$\int L_x dt = K\int \omega_m dt = K\theta_m$$

As an example, if $L_x' = K_1 A_z$ (where $A_z$ is a linear acceleration) then, if $\omega_m$ is constantly adjusted to prevent rotation about $x$—$x$, $L_x = -L_x'$. Then $\int K_1 A_z dt = K\theta_m$ or $K_1 V_z = K\theta_m$, and a counter on the motor shaft would read proportional to the linear velocity.

As a second example, if $L_x' = K_2 \omega_y$ (when $\omega_y$ is an input angular velocity, as in an integrating gyroscope) then $\int K_2 \omega_y dt = K\theta_m$ and $K_2 \theta_y = K\theta_m$ and a counter on the motor shaft would read proportional to the angular displacement.

It is also noted that, if desired, an output proportional to the motor speed, $\omega_m$, may be utilized directly to measure the input. In the case of the accelerometer application, for example, $$L_x = K\omega_m$$

or $$L_x' = K_1 A_z$$

To maintain the pickoff at null, $$L_x = -L_x'$$

Therefore, $$K\omega_m = -K_1 A_z$$

and $$A_z = K_3 \omega_m$$

Thus, the output motor velocity would be proportional to the input acceleration with $K_3$ the constant of proportionality. A suitable measuring device, not illustrated, for example, a linear electrical voltage generator, might be attached to the motor shaft to produce an output voltage proportional to input acceleration.

In both modifications of the invention illustrated and described herein, there is thus provided a linear, viscous torquer adaptable for use in conjunction with a rate integrator type of gyroscope, a force balance accelerometer, or other device requiring or utilizing a reaction torque accurately linear with angular velocity of a shaft.

Although the present invention has been described with a certain degree of particularity, it is understood that various modifications in the details and arrangements of parts may be had without departing from the spirit and scope of the invention as hereinafter claimed.

I claim:

1. In a device having a housing, first and second members mounted in close proximity to each other for angular movement relative to said housing, a fluid cooperating with said members and having Newtonian characteristics for linearly transmitting torquing action from said first member to said second member, pickoff means for detecting angular movement of said second member relative to said housing, motor means controlled by said pickoff means connected to rotate said first member relative to said housing.

2. The structure as defined in claim 1 including a gyro wheel rotatably mounted in said second member with its spin axis perpendicular to the axis of angular movement of that member.

3. A device comprising a housing member, first and second angularly movable members mounted in close proximity to each other in said housing for angular movement about parallel axes, fluid in said housing cooperating with said members and having Newtonian characteristics for linearly transmitting torquing action from one member to the other member, a motor directly connected to one of said members and fluid connected to the other of said members, and means responsive to relative movement of said members to control said motor.

4. The structure of claim 3 wherein said axes are superimposed on each other.

5. A device comprising a housing member, first and second angularly movable members mounted in close proximity to each other in said housing for angular movement about an axis, a fluid in said housing and cooperating with said members and having Newtonian characteristics for linearly transmitting torquing action from one member to the other member, a gyro wheel rotatably carried by one of said members with its spin axis perpendicular to said first mentioned axis, a motor drivingly connected to one of said members, and means responsive to relative movement of said members to control said motor.

References Cited in the file of this patent

UNITED STATES PATENTS

| | | |
|---|---|---|
| 2,629,472 | Sterner | Feb. 24, 1953 |
| 2,752,791 | Jarosh et al. | July 3, 1956 |
| 2,834,219 | King | May 13, 1958 |

FOREIGN PATENTS

| | | |
|---|---|---|
| 687,784 | Great Britain | Feb. 18, 1953 |

OTHER REFERENCES

Publication, Dow Corning Silicone Note Book, Fluid Series No. 3, September 1948, pages 4 and 16.